United States Patent
Seo et al.

(10) Patent No.: US 9,086,959 B2
(45) Date of Patent: Jul. 21, 2015

(54) APPARATUS TO ACCESS MULTI-BANK MEMORY

(75) Inventors: Woong Seo, Hwaseong-si (KR);
Soo-Jung Ryu, Hwaseong-si (KR);
Yoon-Jin Kim, Seoul (KR);
Young-Chul Cho, Yongin-si (KR);
Il-Hyun Park, Yongin-si (KR);
Tae-Wook Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 12/902,681

(22) Filed: Oct. 12, 2010

(65) Prior Publication Data

US 2011/0087821 A1 Apr. 14, 2011

(30) Foreign Application Priority Data

Oct. 13, 2009 (KR) .................. 10-2009-0097244

(51) Int. Cl.
*G06F 12/10* (2006.01)
*G06F 12/06* (2006.01)
*G06F 3/06* (2006.01)
*G06F 12/02* (2006.01)

(52) U.S. Cl.
CPC ............ *G06F 12/0607* (2013.01); *G06F 3/067* (2013.01); *G06F 12/0215* (2013.01); *G06F 12/0292* (2013.01)

(58) Field of Classification Search
CPC .............. G06F 12/0207; G06F 12/109; G06F 12/0607; G06F 12/0215; G06F 3/067; G06F 12/0292

USPC ............................................................. 711/5
See application file for complete search history.

(56) References Cited

U.S. PATENT DOCUMENTS

| 6,219,725 | B1 * | 4/2001 | Diehl et al. ............... 710/26 |
| 7,346,750 | B2 | 3/2008 | Ishikawa |
| 7,463,267 | B2 | 12/2008 | Wise et al. |
| 7,725,641 | B2 | 5/2010 | Park et al. |
| 2001/0042174 | A1 * | 11/2001 | Gupta et al. ............ 711/127 |
| 2005/0289286 | A1 * | 12/2005 | Ohwada ..................... 711/1 |
| 2006/0245265 | A1 | 11/2006 | Jeong |
| 2007/0076511 | A1 | 4/2007 | Choi |
| 2007/0162643 | A1 | 7/2007 | Tousek |
| 2008/0062188 | A1 | 3/2008 | Park et al. |
| 2008/0140980 | A1 | 6/2008 | Mei et al. |
| 2008/0189493 | A1 | 8/2008 | Nakada |

FOREIGN PATENT DOCUMENTS

| KR | 10-2005-0027923 | 3/2005 |
| KR | 10-2006-0113019 | 11/2006 |
| KR | 10-2007-0037536 | 4/2007 |

(Continued)

*Primary Examiner* — Jae Yu
(74) *Attorney, Agent, or Firm* — NSIP Law (57) ABSTRACT

A method of controlling access to a multi-bank memory, and an apparatus to perform the method, is provided. For the access control, a stride register is provided to store stride values determined by a processor during a run time. A memory controller controls access to a logical block in row and column directions, in an interleaved manner, the logical block having a width determined according to the stride values stored in the stride register. Accordingly, simultaneous access to a plurality of pieces of data at successive addresses adjacent in the row and column directions may be made.

18 Claims, 6 Drawing Sheets

(56) References Cited

FOREIGN PATENT DOCUMENTS

| KR | 10-2007-0093447 | 9/2007 |
|----|-----------------|--------|
| KR | 10-2008-0023024 | 3/2008 |
| KR | 10-2008-0025053 | 3/2008 |
| KR | 10-2008-0044102 | 5/2008 |
| KR | 10-2009-0082910 | 7/2009 |
| WO | WO 2006/082923  | 8/2006 |

* cited by examiner

APPARATUS TO ACCESS MULTI-BANK MEMORY

CROSS-REFERENCE TO RELATED APPLICATION

This application claims the benefit under 35 U.S.C. §119 (a) of a Korean Patent Application No. 10-2009-0097244, filed on Oct. 13, 2009, in the Korean Intellectual Property Office, the entire disclosure of which is incorporated herein by reference for all purposes.

BACKGROUND

1. Field

The following description relates to a technique of controlling access to a multi-bank memory.

2. Description of the Related Art

A digital signal processor into which a multi-core and a multi-port memory access architecture are adopted reduces memory conflicts by using a multi-bank memory. A multi-bank architecture involves the segmentation of a memory into a plurality of banks using address block based allocation or interleaved allocation. The interleaved allocation allocates banks in units of a basic data width.

The address block based allocation, which allocates a bank for each address block, is effective when an address area which each memory request port accesses is fixed. However, a memory conflict may occur when two or more ports access the same address area. Meanwhile, the interleaved allocation allocates adjacent, successive address values to different banks, and accordingly, the interleaved allocation is effective when accesses to successive addresses of a memory simultaneously occur. For example, when a core accesses four successive bytes as a word, a memory controller causes each bank to access a byte, thereby accessing the four bytes within a clock cycle.

SUMMARY

The following description relates to a multi-bank memory architecture allowing simultaneous access to a plurality of memory areas having successive addresses in a row direction as well as simultaneous access to a plurality of memory areas having successive addresses in a column direction.

In one general aspect, there is provided a stride register to store stride values determined by a processor during a run time. A memory controller controls access to a logical block in row and column directions, in an interleaved manner, the logical block having a width decided according to the stride values stored in the stride register.

In another general aspect, there is provided an address converter to allocate successive pieces of data adjacent in the column direction to respective banks spaced in an integer multiple, for example, a power of 2 away from each other.

According to various ones of these aspects, by allowing the memory controller to, in a hardware fashion, align and transfer data required by a processor core as well as increasing a memory bandwidth in image processing accompanying access to a frame memory in row and column directions, it is possible to reduce a core cycle to be consumed in data alignment, such as packing and unpacking.

The foregoing and/or other aspects may be achieved by providing a multi-bank memory access apparatus including a stride register to store stride values and an address converter to control access to a logical block within the multi-bank memory in a row and column direction, the logical block having a width decided according to the stride values.

The stride values stored in the stride register may be determined by a processor during a run time.

The address converter may control access to the logical block such that successive pieces of data adjacent in the column direction are respectively allocated to different banks in the multi-bank memory.

The address converter may control access to the logical block such that successive pieces of data adjacent in the column direction are respectively allocated to adjacent, successive banks in the multi-bank memory.

The address converter may control access to the logical block such that successive pieces of data adjacent in the column direction are respectively allocated to banks spaced an integer multiple away from each other in the multi-bank memory.

The address converter may control access to the logical block such that successive pieces of data adjacent in the column direction are respectively allocated to banks spaced a power of 2 away from each other in the multi-bank memory.

The address converter may include a 2-dimensional address converter to convert a received memory access address into a 2-dimensional address value on the logical block having the width determined according to the stride values, and a bank selector to output a bank selection signal to select a bank from among banks in the multi-bank memory using the 2-dimensional address value, and an address value for the selected bank.

The bank selection signal may be defined according to a sum of 2-dimensional address values x and y converted by the 2-dimensional address converter.

The multi-bank memory access apparatus may further include a memory access controller to control access to the multi-bank memory using a different method from that performed by the address converter.

The memory access controller may control access to the multi-bank memory using an address block-based allocation method.

The memory access controller may control access to the multi-bank memory using an interleaved allocation method to allocate banks in units of a data width.

The multi-bank memory access apparatus may further include an operation selector to select one of the address converter and the memory access controller according to a selection signal from a processor core in order to operate the selected one.

The operation selector may select only one of the address converter and the memory access controller according to the selection signal from the processor core in order to operate the selected one.

The foregoing and/or other aspects may also be achieved by providing a method of accessing a multi-bank memory, the method comprising storing stride values in a stride register and controlling access to a logical block within the multi-bank memory in a row and column direction, the logical block having a width decided according to the stride values.

The method may further include determining the stride values during a run time to be stored in the stride register.

The access to the logical block may be controlled such that successive pieces of data adjacent in the column direction are respectively allocated to different banks in the multi-bank memory.

The foregoing and/or other aspects may also be achieved by providing a method of controlling access to a multi-bank memory, the method comprising reading and/or writing data from/to the multi-bank memory such that successive pieces of data adjacent in a column direction are respectively allocated to different banks in the multi-bank memory.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
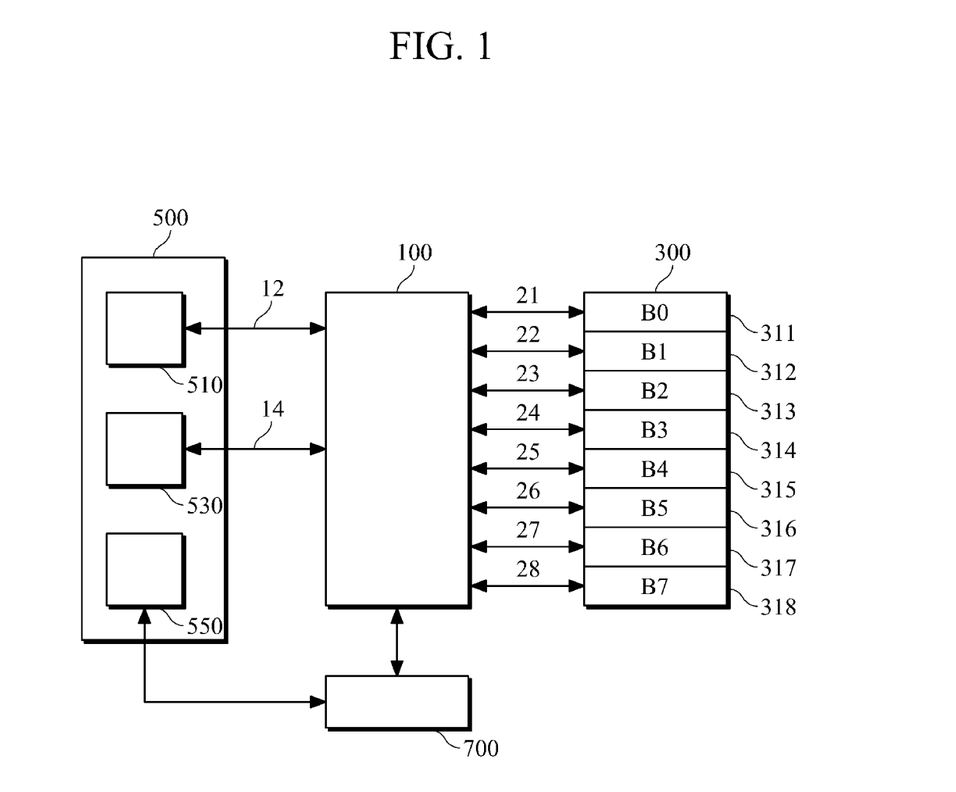
FIG. 1 is a diagram schematically illustrating a portion of a signal processing system into which a multi-bank memory access apparatus according to an example is adopted.

FIG. 1 is a diagram schematically illustrating a portion of a signal processing system in which a multi-bank memory access apparatus according to an example is adopted. Referring to FIG. 1, the signal processing system may include a multi-bank memory 300 having a plurality of banks allowing individual access, a stride register 700 which may store stride values, and an address converter 100 which may control access to a logical block in a row direction and/or in a column direction, in an interleaved manner, the logical block having a width determined according to the stride values.

In the current example, a processor 500 which accesses the multi-bank memory 300 through the address converter 100 may be a multi-core processor which may include two or more processor cores, and which in this example include processor cores 510, 530, and 550. The processor cores 510 and 530 that access the multi-bank memory 300 may be allocated memory ports 12 and 14, respectively. In the current example, a word width which the processor cores 510 and 530 access through the respective memory ports 12 and 14 may be 4 bytes, that is, 32 bits. However, it will be apparent to one of ordinary skill in the art that the word width is not limited to 4 bytes, but may include any number of whole or partial bytes.

In the current example, the multi-bank memory 300 may be composed of 8 (=2³) memory banks 311 though 318 and may have a structure allowing the address converter 100 to access the individual memory banks 311 through 318 independently via the corresponding ports 21 through 28. The address converter 100 may access the individual memory banks 311 through 318 in units of, for example, a byte.

According to an example, the memory access apparatus may include a stride register 700. Stride values which may be stored in the stride register 700 may be determined by the first processor core 550 during a run time. The address converter 100 may access the multi-bank memory 300 in different ways according to the stride values stored in the stride register 700.

In image processing, there often happens a case in which a plurality of pieces of data stored in a frame memory are sequentially accessed in a column direction as well as in a row direction. For example, image filtering may be performed simultaneously in a row direction and in a column direction. Further, in image compression or filtering, data stored in a frame memory may be accessed in units of blocks having a size of 2×2, 4×4, 8×8, 16×16, etc. Access to data which is stored in the same bank and which is stored at successive addresses in a column direction causes a delay, which leads to a reduction of memory access bandwidth.

According to an example, the first processor core 550 may determine a frame width of image data being currently processed during a run time through the stride register 700. The address converter 100 may recognize the frame width from stride values stored in the stride register 700 and may apply an interleaved method in row and column directions in controlling memory writing and/or reading.

Figure 2:
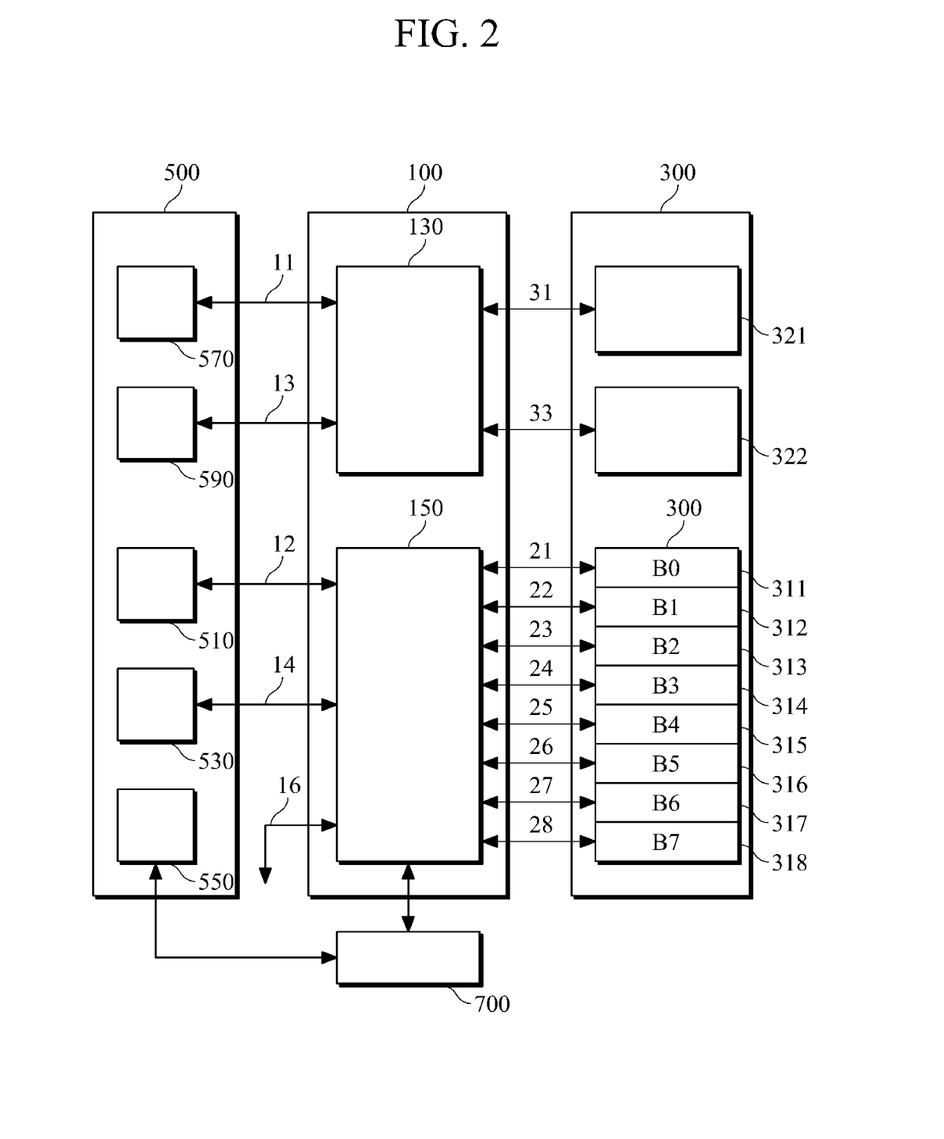
FIG. 2 is a diagram illustrating a portion of a signal processing system into which a multi-bank memory access apparatus according to another example is adopted.

FIG. 2 is a diagram illustrating a portion of a signal processing system in which a multi-bank memory access apparatus according to another example is adopted. In the current example, components corresponding to those illustrated in the example of FIG. 1 are denoted using like reference numbers. In the current example, a processor 500 may allow, when executing a program, second and third processor cores 510 and 530 to process parts requiring access in a row or column direction, and fourth and fifth processor cores 570 and 590 to process the remaining parts. The fourth and fifth processor cores 570 and 590 may access memory banks 321 and 322 through ports 11 and 13. In response to access requests from core-side ports 11 and 13, a memory access controller 130, which may be provided in the address converter 100, may use a known method, such as a block-based allocation method or an interleaved allocation method, to access requested memory banks through memory bank-side ports 31 and 33.

The second and third processor cores 510 and 530 may access the memory banks 311 through 318 through core-side ports 12 and 14. An address converter 150, which may be provided in the address converter 100, may access the memory banks 311 through 318 through bank-side ports 21 through 28 in response to access requests received through the core-side ports 12 and 14. The address converter 150 may control access to a logical block in row and column directions, in an interleaved manner, the logical block having a width determined according to stride values stored in the stride register 700.

Before the access in the row and column directions, the first processor core 550 may write stride values corresponding to a width of a frame memory being currently processed in the stride register 700, and may control writing of frame data from an external port 16 to the memory banks 311 through 318 using direct memory access (DMA). Accordingly, no unnecessary delay is caused and high-speed processing in the row and column directions on the frame memory may be performed immediately after the previous processing. The following procedure may be the same as that described in the example of FIG. 1 and accordingly a detailed description thereof will be omitted.

Figure 3:
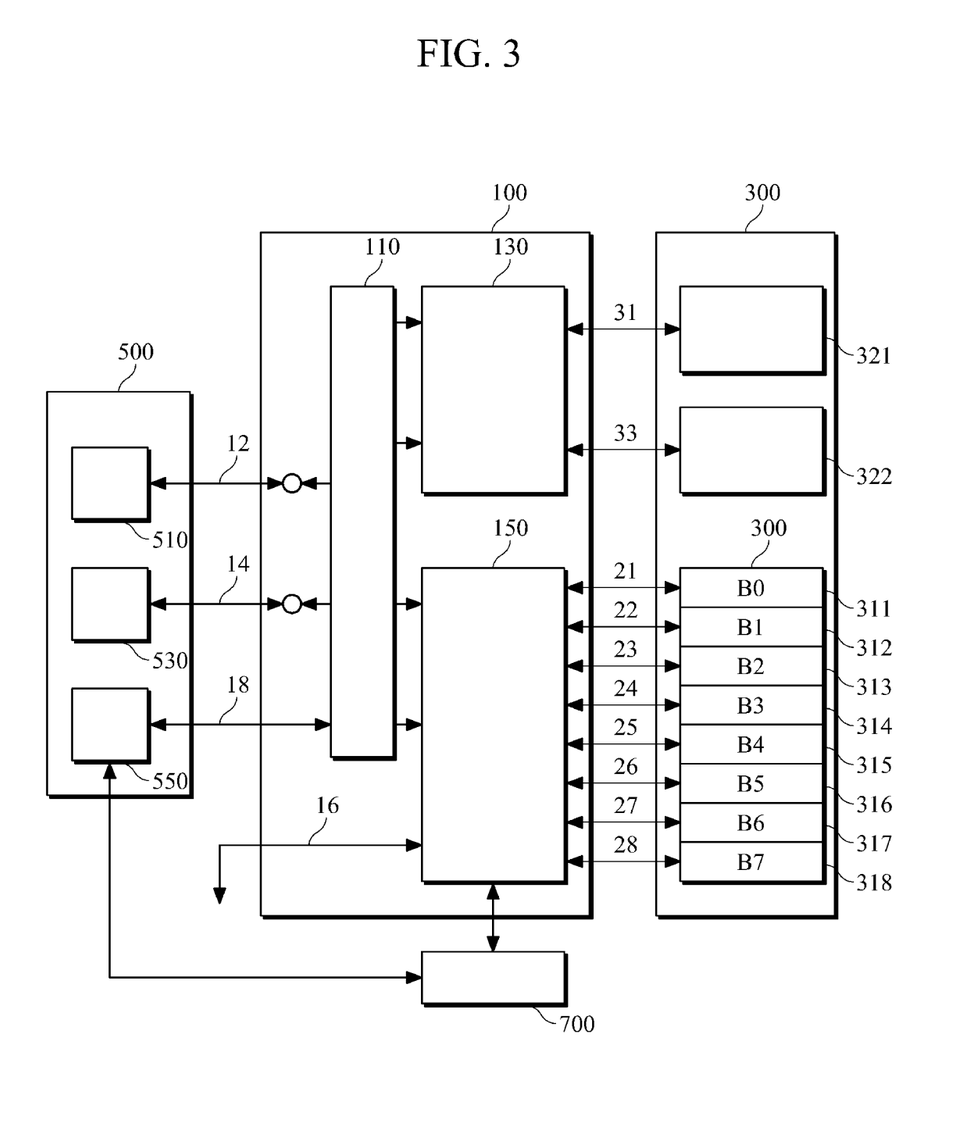
FIG. 3 is a diagram illustrating a portion of a signal processing system into which a multi-bank memory access apparatus according to yet another example is adopted.

FIG. 3 is a diagram illustrating a portion of a signal processing system in which a multi-bank memory access apparatus according to yet another example is adopted. In the current example, components corresponding to those illustrated in the example of FIG. 2 are denoted using like reference numbers. In the current example, a processor 500 may output, when access in row and column directions is needed during a run time of a program, a selection signal 18 to an operation selector 110, which may be provided in the address converter 100, so that the operation selector 110 may select an address converter 150, the selection being made between choices of a memory access controller 130 and the address converter 150, so that the address converter 150 operates. In other words, the processor 500 may output the selection signal 18 during the run time of the program such that the operation selector 110 may select one of the memory access controller 130 and the address converter 150 so that the selected one operates.

The memory access controller 130 may use a known method, such as a block-based allocation method or an interleaved allocation method, to access corresponding memory banks through memory bank-side ports 31 and 33 in response to access requests received through core-side ports 12 and 14. The selection signal 18 may be generated by the processor core 550.

The address converter 150 may access a multi-bank memory having a plurality of memory banks 311 through 318 through bank-side ports 21 through 28 in response to access requests received through core-side ports 12 and 14. The address converter 150 may control access to a logical block in row and column directions, in an interleaved manner, the logical block having a width decided according to stride values stored in a stride register 700.

Before the access in the row and column directions, a first processor core 550 may write stride values corresponding to a width of a frame memory being currently processed in the stride register 700, and may control writing of frame data from an external port 16 to the memory banks 311 through 318 using direct memory access (DMA). Accordingly, no unnecessary delay is caused and high-speed processing in the row and column directions on the frame memory may be performed immediately after the previous processing. The following procedure is the same as that described in the above-described examples and accordingly a detailed description thereof will be omitted.

Figure 4:
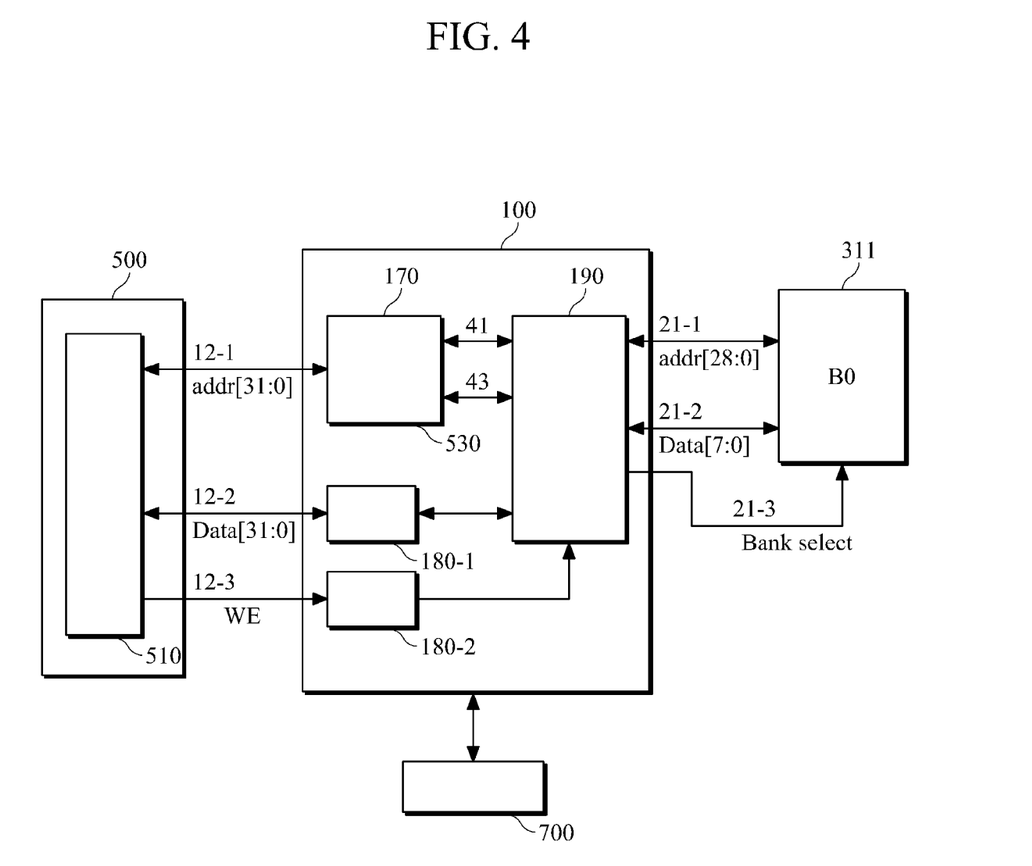
FIG. 4 is a diagram illustrating in greater detail some elements of the portion of the signal processing system illustrated in FIG. 1.

FIG. 4 is a diagram illustrating in greater detail some elements of the portion of the signal processing system illustrated in FIG. 1 in which the multi-bank memory access apparatus is adopted. As illustrated in FIG. 4, the multi-bank memory access apparatus may include an address converter 100. The address converter 100 may include a 2-dimensional address converter 170 to convert a received memory access address into a 2-dimensional address value on a logical block having a width determined according to stride values, and a bank selector 190 to output a bank selection signal to select one from among the memory banks 311 through 318 according to the 2-dimensional address value and an address value for the selected bank.

For example, when the 2-dimensional address converter 170 receives an address value ADDR and a stride value stride, the 2-dimensional address converter 170 may output a 2-dimensional coordinate value (x0, y0) by obtaining integer values y0 and x0 that respectively satisfy the following Equations (1) and (2):

$$y0 \times stride <= ADDR < (y0+1) \times stride, \text{ and} \quad (1)$$

$$x0 = ADDR - y0 \times stride. \quad (2)$$

The 2-dimensional coordinate value (x0, y0) approximately corresponds to a 2-dimensional coordinate value on a frame memory.

Here, an operation "//" is defined such that the integer value y0 satisfying the Equation (1) is expressed as ADDR//stride.

Then, the bank selector 190 may select a first activated bank which may be represented as (y0[k−1:0]+x) % N where N is the number of banks, k is an index satisfying $N=2^k$, and % represents a modulo operation. In the current example, the number of banks is a power of 2. That is, the bank selector 190 may select a bank based on a sum (x+y) of 2-dimensional address values x and y converted by the 2-dimensional address converter 170. An address value for the first activated bank, which is output from the bank selector 190, is y0× (stride//k)×(x0//k).

The 2-dimensional address converter 170 may output a 2-dimensional coordinate value (x0, y0) to the bank selector 190 through terminals 41 and 43 according to an address value addr[31:0] received through a processor-side port 12-1. Then, the bank selector 190 may output a selection signal bank select to select one from among the memory banks 311 through 318 through a terminal 21-3. Also, the bank selector 190 may calculate an address value for the selected bank and output the address value through a terminal 21-1. Upon memory reading, data[7:0] may be read through a terminal 21-2. Data read from four banks may be collected in a latch 180-1 and output through a terminal 12-2. Upon memory writing, a latch 180-2 may buffer a write enable signal WE to be used in timing adjustment.

Figure 5:
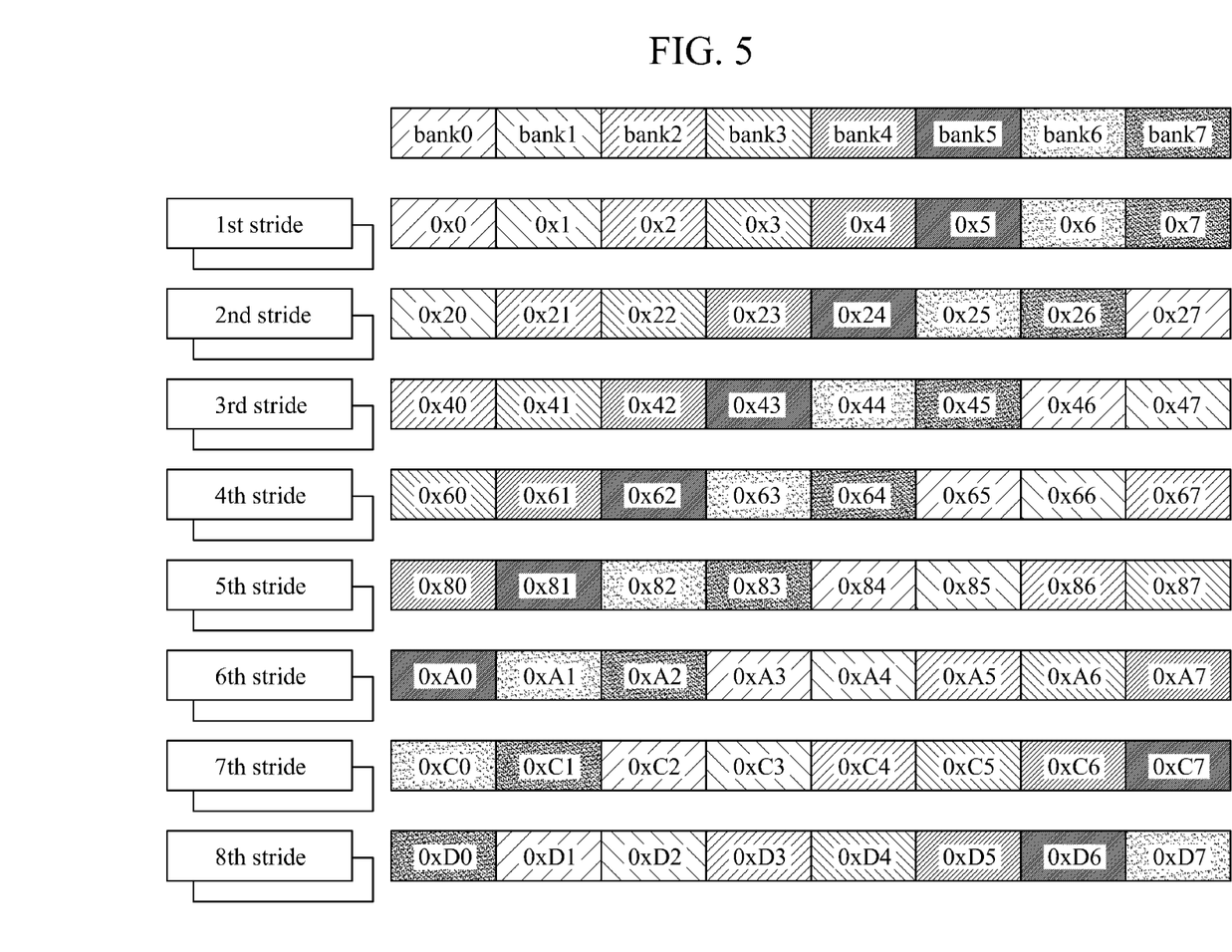
FIG. 5 is a view illustrating a bank allocation method according to an example.

FIG. 5 is a view illustrating a bank allocation method according to an example. The top line of FIG. 5 illustrates shadings assigned to individual banks. For example, 0x0 of a first stride, 0x27 of a second stride, 0x46 of a third stride, . . . are stored in bank0, as illustrated by the common shading shared by these locations. Likewise, 0x1 of the first stride, 0x20 of the second stride, 0x47 of the third stride, . . . are stored in bank1.

As illustrated in FIG. 5, successive pieces of data adjacent in a column direction may be allocated to different banks. Accordingly, simultaneous access to a plurality of pieces of data is positioned at successive addresses in a column direction is allowed. That is, when a coordinate value (x, y) on a 2-dimensional plane is received, bank allocation may be performed in an interleaved manner according to a value of x+y, in such a manner that addresses positioned in an oblique direction on the 2-dimensional plane may be allocated to the same bank.

In the current example, successive pieces of data adjacent in a column direction may be allocated to different banks spaced a power of 2 away from each other. That is, for example, if left top data (0, 0) in a 4×4 block data is stored at bank 0, successive data in a column direction, that is, data (0, 1) may be stored at bank 4. This is because of data accesses occupying a size of a power of 2 which occur frequently in image processing.

In the current example, since four horizontally successive pieces of data, such as 0x0, 0x1, 0x2 and 0x3, are stored in different banks, the four horizontally successive pieces of data may be simultaneously accessed by a processor. Also, four vertically successive pieces of data, such as 0x0, 0x20, 0x40 and 0x60, are stored in different banks and accordingly the four vertically successive pieces of data may also be simultaneously accessed by the processor.

The 2-dimensional address converter 170 (see FIG. 4) may be implemented by a program as follows.

```
2D_converter0(addr_p0, stride)
{
y=addr_p0//stride
x=addr_p0−y
}
```

The bank selector 190 (see FIG. 4) may also be implemented as a program as follows. In the following program, x and y represent coordinate values, stride represents a stride value, k represents a power index of 2 to determine the number of banks (the number of banks $N=2^k$) and b_offset represents a size of block access.

```
BankSelector(x, y, stride, k, b_offset)
{
Bank=(yxb_offset+x)/N
X=yx(stride//k)
}
```

When access to data stored at vertically successive addresses is made, access to only 8 bits per cycle has been made in a conventional technique, but in the current example, access to 64 bits (=8 bits×8) per cycle may be made and consequently bandwidth may be increased by 500%.

Figure 6:
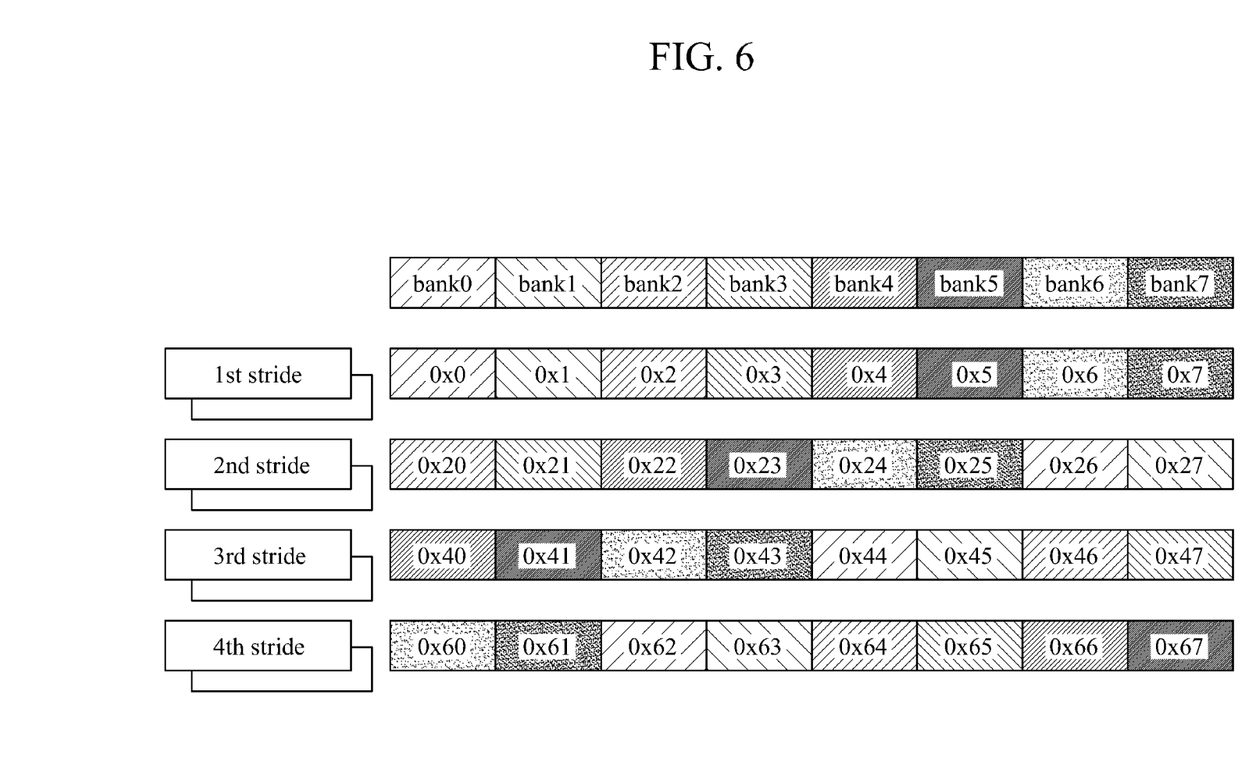
FIG. 6 is a view illustrating a bank allocation method according to another example.

FIG. 6 is a view illustrating a bank allocation method according to another example. This example illustrates a bank allocation method which simultaneously accesses four pieces of data of a 2×2 block. The top line of FIG. 6 illustrates shadings assigned to individual banks. For example, 0x0 of a first stride, 0x26 of a second stride, 0x44 of a third stride, . . . are stored in bank0, as illustrated by the common shading shared by these locations. Also, 0x1 of the first stride, 0x27 of the second stride, 0x45 of the third stride, . . . are stored in bank1.

As illustrated in FIG. 6, successive pieces of data in a column direction may be allocated to different banks. Accordingly, simultaneous access to a plurality of pieces of data positioned at successive addresses in a column direction may be allowed. In the current example, since four horizontally successive pieces of data, such as 0x0, 0x1, 0x2 and 0x3, may be stored in different banks, the four horizontally successive pieces of data may be simultaneously accessed by a processor. Also, four vertically successive pieces of data, such as 0x0, 0x20, 0x40 and 0x60, may be stored in different banks and accordingly the four vertically successive pieces of data may be simultaneously accessed by the processor. Also, since in a 2×2 block, such as (0x0, 0x1, 0x20, 0x21) or (0x23, 0x24, 0x43, 0x44), the respective strides may be individually stored in different banks, simultaneous access to the 2×2 block can be made.

In order to apply the bank allocation method according to the example illustrated in FIG. 6, b_offset may be set to 0x2 upon calling BankSelector described above with reference to FIG. 5. That is, the b_offset represents a block size to be simultaneously accessed.

In the conventional technique, a bandwidth of 16 bits (=4 bits×4) per cycle is allowed to access a 2×2 block, however, in the example illustrated in FIG. 6, a bandwidth of 64 bits (=16 bits×8) per cycle may be allowed to access a 2×2 block.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims. For example, the above-described examples relate to access to a 2×2 block, however, modifications for access to a more generalized block, that is, a M×M or M×N block are also allowed.

What is claimed is:

1. A multi-bank memory access apparatus comprising:
 a stride register configured to store stride values that correspond to a width of a frame memory; and
 an address converter configured to control access to a logical block within a multi-bank memory in row and column directions, the logical block having a width determined according to the stride values,
 wherein the address converter comprises
  a two-dimensional address converter configured to convert the received memory access address into a two-dimensional address value on the logical block, and
  a bank selector configured to output a bank selection signal to select a bank from banks in the multi-bank memory, and an address value for the selected bank, using the two-dimensional address value, and
 wherein the bank selection signal is determined according to a sum of two-dimensional address values x and y converted by the two-dimensional address converter.

2. The multi-bank memory access apparatus of claim 1, wherein the stride values stored in the stride register are determined by a processor during a run time.

3. The multi-bank memory access apparatus of claim 1, wherein the address converter controls access to the logical block based on the stride values such that successive pieces of data adjacent in the column direction are respectively allocated to different banks in the multi-bank memory.

4. The multi-bank memory access apparatus of claim 3, wherein the address converter controls access to the logical block based on the stride values such that successive pieces of data adjacent in the column direction are respectively allocated to adjacent, successive banks in the multi-bank memory.

5. The multi-bank memory access apparatus of claim 4, wherein the address converter controls access to the logical block based on the stride values such that successive pieces of data adjacent in the column direction are respectively allocated to banks that are spaced an integer multiple away from each other in the multi-bank memory.

6. The multi-bank memory access apparatus of claim 5, wherein the address converter controls access to the logical block based on the stride values such that successive pieces of data adjacent in the column direction are respectively allocated to banks that are spaced a power of two away from each other in the multi-bank memory.

7. The multi-bank memory access apparatus of claim 1, wherein the address converter is configured to receive the stride values from the stride register, and receive the memory access address from the processor.

8. The multi-bank memory access apparatus of claim 1, further comprising a multi-core processor that comprises two or more processor cores, the two or more processor cores configured to access the multi-bank memory through two or more ports.

9. The multi-bank memory access apparatus of claim 1, wherein the address converter controls access to the logical block based on the stride values by allocating logical addresses to memory banks in an interleaved order.

10. The multi-bank memory access apparatus of claim 1, wherein the address converter controls access to the logical block based on the stride values by allocating successive logical addresses to multiple different memory banks in an interleaved order.

11. The multi-bank memory access apparatus of claim 1, wherein the address converter controls access to the logical block based on the stride values by allocating successive logical addresses to multiple memory banks in an interleaved order in both the row and column directions.

12. The multi-bank memory access apparatus of claim 1, wherein the address converter enables a plurality of processing cores to simultaneously access a plurality of pieces of data positioned at successive addresses in the column direction of the logical block by allocating the successive pieces of data adjacent in the column direction to multiple memory banks in an interleaved order.

13. A multi-bank memory access apparatus comprising:
a stride register configured to store stride values that correspond to a width of a frame memory; and
an address converter configured to control access to a logical block within a multi-bank memory in row and column directions, the logical block having a width determined according to the stride values;
a memory access controller configured to control access to the multi-bank memory using an interleaved allocation method to allocate logical memory to banks in units of a data width that is determined by the stride values.

14. The multi-bank memory access apparatus of claim 13, further comprising an operation selector configured to select one of the address converter and the memory access controller according to a selection signal from a processor core in order to operate the selected one.

15. The multi-bank memory access apparatus of claim 14, wherein the operation selector selects only one of the address converter and the memory access controller according to the selection signal from the processor core in order to operate the selected one.

16. A method of accessing a multi-bank memory, the method comprising:
storing stride values in a stride register that correspond to a width of a frame memory;
controlling access to a logical block within the multi-bank memory in row and column directions;
converting a memory access address received from a processor to two-dimensional coordinate values x and y based on the stride values, the logical block having a width determined according to the stride values, and
outputting a bank selection signal to select a bank from banks in the multi-bank memory, and an address value for the selected bank, using the two-dimensional coordinate values x and y, wherein the bank selection signal is determined according to a sum of two-dimensional address values x and y converted by the two-dimensional address converter.

17. The method of claim 16, further comprising determining the stride values during a run time to be stored in the stride register.

18. The method of claim 16, wherein the access to the logical block is controlled based on the stride values such that successive pieces of data adjacent in the column direction are respectively allocated to different banks in the multi-bank memory.

* * * * *